United States Patent [19]

Benoit et al.

[11] Patent Number: 4,971,500

[45] Date of Patent: Nov. 20, 1990

[54] ENCLOSED PLASTIC SCREW GROMMET

[75] Inventors: Thomas A. Benoit, Bourbonnais, Ill.; Ronald K. Wilson, Grand Blanc, Mich.

[73] Assignee: Illinois Tool Works Inc., Glenview, Ill.

[21] Appl. No.: 495,118

[22] Filed: Mar. 19, 1990

[51] Int. Cl.[5] .............................. F16B 37/04
[52] U.S. Cl. ...................... 411/182; 411/55; 411/508; 411/913
[58] Field of Search ............... 411/508–510, 411/15, 55, 60, 57, 913, 182

[56] References Cited

U.S. PATENT DOCUMENTS

| | | | |
|---|---|---|---|
| 2,537,786 | 1/1951 | Poupitch | 411/508 |
| 2,555,292 | 5/1951 | Poupitch | 411/508 X |
| 2,560,530 | 7/1951 | Burdeck | 411/508 |
| 3,756,116 | 9/1973 | Schuplin | 411/913 X |
| 4,082,030 | 4/1978 | Erickson | 411/15 |
| 4,580,859 | 4/1986 | Frano et al. | 439/557 X |
| 4,624,585 | 11/1986 | Nix et al. | 411/509 X |
| 4,762,437 | 8/1988 | Mitomi | 411/510 X |

FOREIGN PATENT DOCUMENTS 1493590  9/1967  France ........................... 411/510

Primary Examiner—Gary L. Smith
Assistant Examiner—Jerry Redman
Attorney, Agent, or Firm—Thomas W. Buckman; John P. O'Brien; Donald J. Breh

[57] ABSTRACT

An enclosed plastic screw grommet includes a head flange and a shank portion. The head flange is provided with four radially extending U-shaped slots so as to permit flexing upon insertion into a panel, thereby reducing the force needed. The shank portion includes two sets of opposed ramps formed on its outer surface and which are disposed in an offset relationship with respect to each other to thereby accommodate a variety of panel thicknesses.

11 Claims, 2 Drawing Sheets

ENCLOSED PLASTIC SCREW GROMMET

BACKGROUND OF THE INVENTION

1. Field of the Invention:

This invention relates generally to insulated screw grommets or snap-in nut devices and more particularly, it relates to an improved enclosed plastic screw grommet of the type adapted to be inserted and retained in an aperture in a panel and thereafter to receive a threaded element, such as a screw, for mounting another apertured member to the panel. In one particular application of the present invention, the screw grommet may be pushed into a bumper of an automobile and a license plate is then positioned over the bumper so that its opening is aligned with the aperture in the screw grommet. Finally, a screw is inserted axially through both the opening in the license plate and the aperture in the screw grommet and is then tightened, thereby securing the license plate to the bumper.

2. Description of the Prior Art:

A state of the art search directed to the subject matter of this application uncovered the following patents:

U.S. Pat. Nos. 2,788,047; 2,984,698; 4,082,030; 4,719,977; and 4,580,859.

British Pat. No. 1,139,976.

However, none of the prior art uncovered in the search disclosed an enclosed plastic screw grommet having a head flange and a shank portion like that of the present invention which reduces the force needed upon insertion into a panel aperture and accommodates a variety of panel thicknesses. This is accomplished by providing four radially extending U-shaped slots formed in the head flange so as to permit flexing upon insertion and by providing two sets of interference ramps which are disposed in an offset relationship with respect to each other on the outer surface of the shank portion.

SUMMARY OF THE INVENTION

Accordingly, it is a general object of the present invention to provide an improved enclosed plastic screw grommet which is relatively simple and economical to manufacture and use.

It is an object of the present invention to provide an improved enclosed plastic screw grommet of the type adapted to be inserted and retained in an aperture in a panel and thereafter to receive a threaded element for mounting another apertured member to the panel.

It is another object of the present invention to provide an improved enclosed plastic screw grommet which includes a head flange having four radially extending U-shaped slots in order to reduce the force needed for insertion into a panel aperture.

It is another object of the present invention to provide an improved enclosed plastic screw grommet which includes a shank portion having two sets of interference ramps which are disposed in an offset relationship with respect to each other and formed on its outer surface so as to accommodate a variety of panel thicknesses.

It is still another object of the present invention to provide an improved enclosed plastic screw grommet which is particularly adapted for use in securing a license plate to an automobile bumper.

In accordance with these aims and objectives, the present invention is concerned with the provision of an enclosed plastic screw grommet for insertion and retention in an aperture in a panel and for receiving a threaded element so as to mount another apertured member to the panel. The screw grommet includes a head flange and a shank portion. The head flange is formed with four radially extending U-shaped slots which are equally spaced around its periphery. Each of the slots extends inwardly from the periphery and terminates a short distance from a central opening formed in the head flange so as to present four head portions being resiliently inwardly flexible to facilitate its insertion into the panel aperture with a reduced force.

The shank portion includes a first set of opposed ramps formed on its outer surface and a second set of opposed ramps which are disposed in an offset relationship with respect to the first set of ramps. The first set of ramps are located a first predetermined distance from a back surface of the head flange. The second set of ramps are located at a second predetermined distance from the back surface of the head flange to thereby accommodate a variety of panel thicknesses.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

Figure 1:
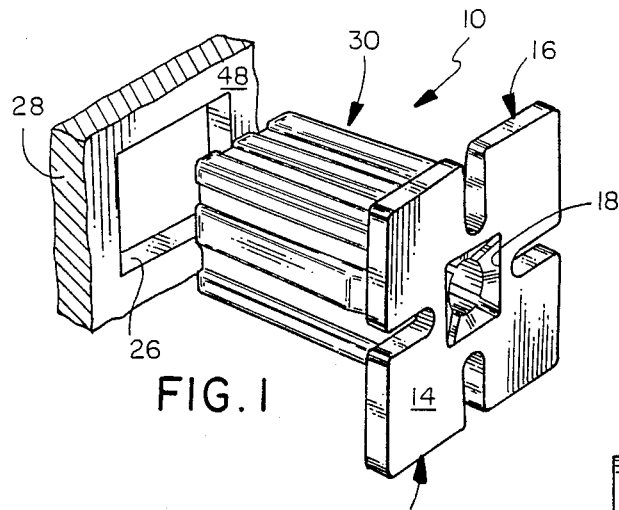
FIG. 1 is a perspective view of a screw grommet constructed in accordance with the principles of the present invention, prior to insertion into an aperture in a panel.

Referring now in detail to the various views of the drawings, and in particular to FIGS. 1 through 5, there is shown an enclosed screw grommet 10 which is constructed in accordance with the principles of the present invention. The screw grommet 10 is preferably formed of a unitary structure which is manufactured from a resilient plastic material or the like through a conventional plastic process such as injection molding. The screw grommet 10 includes a head flange 12 which is of a generally flat square shape. However, it should be apparent to those skilled in the art that the head flange 12 may have a round, rectangular, or any other shape than the square shape shown in the drawings. The head flange 12 has a flat front surface 14 and a flat back surface 16. The head flange 12 also has a generally square shaped opening 18 formed through its center. The opening 18 is defined by four inwardly inclined wall segments 20a-20d which terminates in a threaded element receiving bore 22.

The head flange 12 is provided with four radially extending slots 24a-24d (FIG. 2) which are equally spaced around its periphery. The slots are of a generally U-shaped configuration, each extending inwardly from its free peripheral edge in the intermediate area of the corresponding sides thereof and terminating a short distance from the square shaped opening 18. Thus, it can be seen that the U-shaped slots 24a-24d are positioned opposite the mid-portions of the corresponding wall segments 20a-20d. As a result, the head flange has been divided into four substantially square shaped head portions 12a-12d which permits flexing during the insertion of the screw grommet into an aperture 26 in a panel 28 (FIG. 1).

The screw grommet 10 also includes a shank portion 30 (FIG. 3) formed integrally with the head flange and extends away from the head flange along the axis of the bore 22. The shank portion 30 is of a reduced section with respect to the head flange and has a polygon shape so as to conform to the contour of the aperture 26. While the shank portion 30 is shown to be generally square shaped, it should be understood that other polygon shapes may be used.

Figure 3:
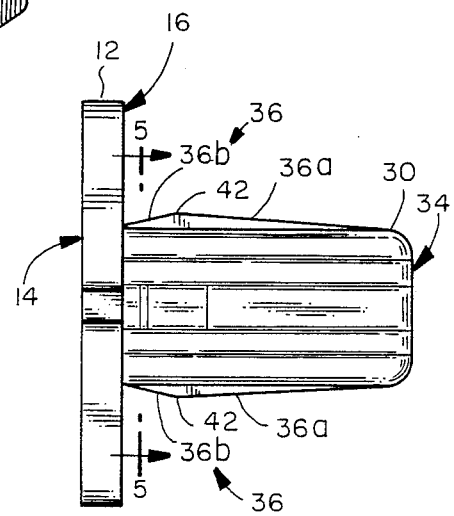
FIG. 3 is a side view, taken along the lines 3—3 of FIG. 2.

The shank portion 30 includes a plurality of convex-shaped corner posts 32 (FIG. 5) that extend axially and outwardly from the back surface 16 of the head flange 12 adjacent the bore 22 and are interconnected at the opposite end by a common flat end member 34 (FIG. 3). In the present embodiment, there are shown four corner posts 32. A first set of opposed interference ramps 36 are formed on the outer surface of the shank portion 30 in an intermediate area between the adjacent corner posts 32. A second set of opposed ramps 38 are also formed on the outer surface of the shank 30 and are disposed perpendicular to these first ramps 36 and are located in an intermediate area between the adjacent corner posts 32. The first ramps 36 are disposed in an offset relationship with respect to the second ramps 38.

Figure 7:
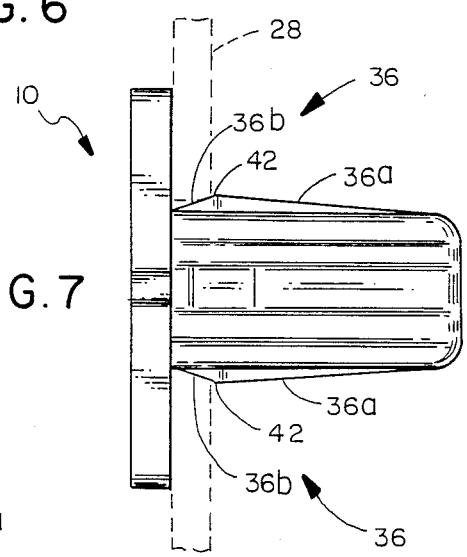
FIG. 7 is a side elevational view similar to FIG. 6 as it is rotated 90°, with a thicker panel being shown in the dotted lines.

Each of the opposed ramps 36, 38 is provided with an axially extending transversely concave inner surface 40 (FIG. 5) all of which lie on the pitch diameter of the screw to be associated therewith and form the threaded element receiving bore 22 of the shank portion 30 which is substantially co-axial with the opening 18 in the head flange 12. Referring particularly to FIGS. 3 and 7, each of the opposed ramps 36 taper outwardly or gradually increases in height or thickness, as at surfaces 36a, from the entering end member 34 to apices 42 and then tapers inwardly or gradually decreases in thickness, as at surfaces 36b, the remainder of the way to the back surface 16 of head flange 12. The apices 42 serves to form a first shoulder means spaced on the two opposed ramps 36 a first predetermined distance from the back surface 16.

Figure 4:
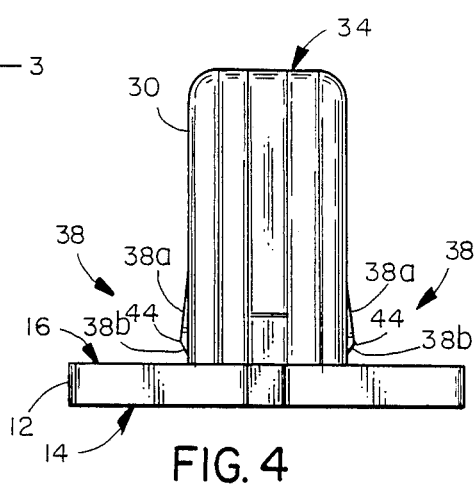
FIG. 4 is a top plan view, taken along the lines 4—4 of FIG. 2.
Figure 6:
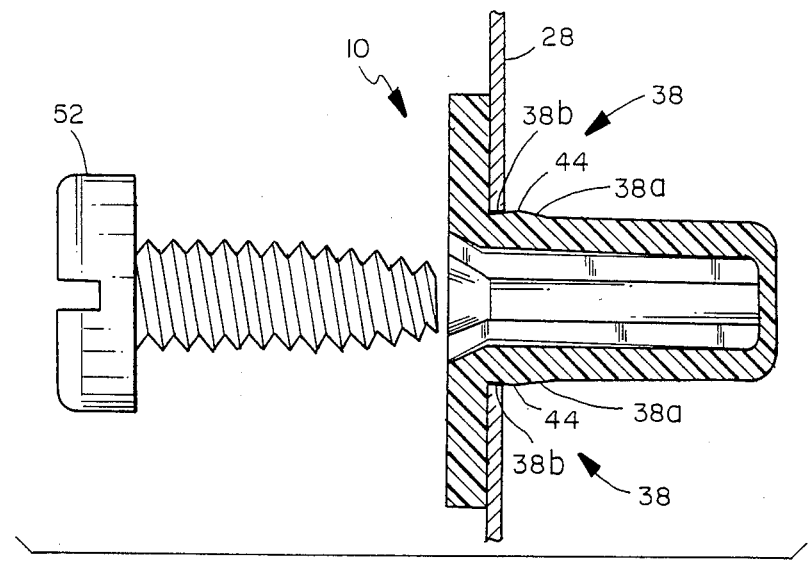
FIG. 6 is an elevational view of the screw grommet of FIG. 1 after insertion into the apertured panel.

In FIG. 4 and 6, each of the opposed ramps 38 tapers outwardly or gradually increases in height or thickness, as at surfaces 38a, from the entering end member 34 to apices 44 and then tapers inwardly or gradually decreases in thickness, as at surfaces 38b, the remainder of the way to the back surface 16 of the head flange 12. The apices 44 serves to form a second shoulder means spaced on the two opposed ramps 38 a second predetermined distance from the back surface 16. In this manner, the second shoulder means located at the second predetermined distance is offset from the first shoulder means and is located at a closer distance to the back surface 16 than the first shoulder means thereby accommodating a variety of panel thicknesses.

Figure 5:
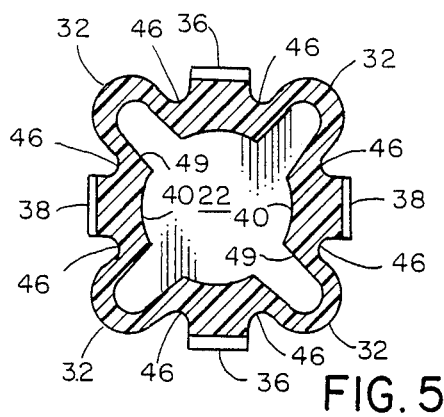
FIG. 5 is a cross-sectional view, taken along the lines 5—5 of FIG. 3.

A plurality of thin U-shaped spring-like members 46 (FIG. 5) are provided for interconnecting each of the ramps 36, 38 to the corresponding adjacent corner posts 32. The U-shaped spring-like members 46 extend axially between the back surface 16 of the head flange 12 and the end member 34 and serves to support each of the ramps 36 and 38 as well as to peripherally seal the bore 22 defined by the concave inner surfaces 40 from the surrounding environment. As illustrated in FIG. 5, there are provided eight U-shaped spring-like members 46.

Figure 2:
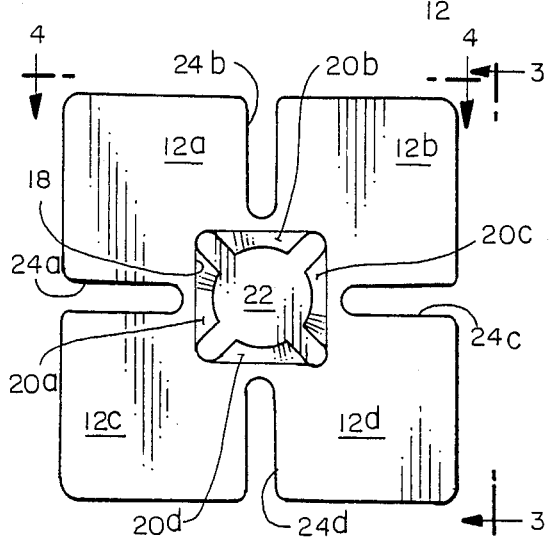
FIG. 2 is a front end view of the screw grommet of FIG. 1.

In order to use the screw grommet 10, the shank portion 30 is inserted into the aperture 26 in the panel 28 (FIG. 1) until the back surface 16 thereof engages against the exposed surface 48 of the panel 28. The aperture 26 is formed of a shape complementary to the sectional shape of the shank portion 30. The outwardly inclined surfaces 36a engage the aperture-defining edges of the panel 28 and causes the internal U-shaped slots 49 formed by the corner posts 32 to be closed up and the ramps 36, 38 to collapse or flex inwardly to allow its passage through the aperture 26, to the position shown in FIGS. 6 and 7. By providing the four head portions 12a-12d as shown in FIGS. 1 and 2, greater flexibility is imparted to the head flange 12 due to it being resiliently inwardly flexible so that material having a greater inherent rigidity may be utilized but yet still facilitate insertion of the screw grommet into the aperture in the panel with a reduced amount of force. As the shoulders 42 and 44 through the aperture 26 are exposed to the back surface of the panel 28, the U-shaped spring-like elements 46 will urge the inwardly inclined surfaces 36b, 38b radially outwardly to underlie the panel 28.

Figure 8:
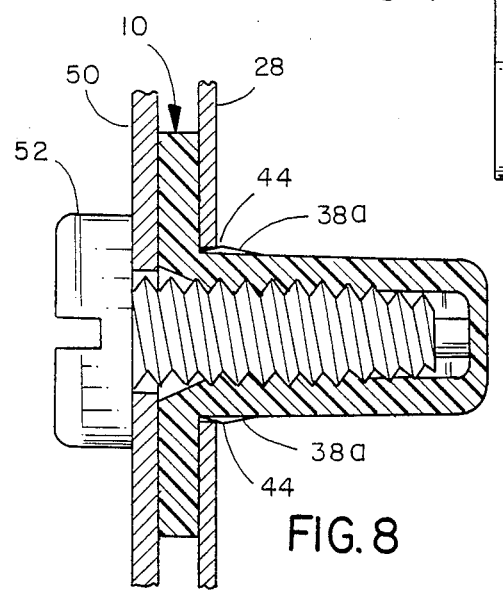
FIG. 8 is an elevational view similar to FIG. 7, but with a screw threaded through the screw grommet for securing another apertured plate.

Any suitable apertured member 50, such as a license plate, to be secured is then positioned over the grommet so that the aperture therein is aligned with the opening 18 in the grommet, and a screw 52 is inserted through the aperture in the plate 50 and into the bore 22 in the grommet. As the screw is threaded into the grommet, complementary threads are cut in the walls of the bore 22. Alternatively, the grommet may be already provided with internal threads. As the screw 52 progresses through the shank portion 30, the inwardly inclined surfaces 36b, 38b are further expanded away from each other so as to be pressed tightly against the back surface of the panel 28 to hold securely the grommet in place and to draw the back surface 16 of the head flange 12 of the grommet securely against the exposed surface 48 of the panel 28, as illustrated in FIG. 8.

From the foregoing detailed description, it can thus be seen that the present invention provides an improved enclosed plastic screw grommet having a head flange and a shank portion. The head flange is provided with four radially extending U-shaped slots so as to permit flexing upon insertion of the grommet into a panel. Further, the shank portion includes a first set of opposed ramps formed on its outer surface and a second set of opposed ramps which are disposed in an offset relationship with respect to the first set of opposed ramps, thereby accommodating a variety of panel thicknesses.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. An enclosed plastic screw grommet for insertion and retention in an aperture in a panel for receiving a threaded element so as to mount another apertured member to the panel, said grommet comprising:
   a relative flat rectangularly-shaped head flange having a central opening therein and being formed of a front surface and a back surface;
   said head flange being formed with four radially extending U-shaped slots which are equally spaced around its periphery, each of said slots extending inwardly from the periphery and terminating a short distance from said opening so as to present four head portions being resiliently inwardly flexible to facilitate its insertion into the panel aperture with a reduced force;
   a shank portion extending from the back side of said head flange and defining a threaded element receiving bore which is in communication with said central opening in said head flange;
   said shank portion including four convexshaped corner posts extending axially from said back surface of said head flange, an end member interconnecting the free ends of said corner posts and being spaced from said back surface to define a closed free entering end on said shank portion, a first set of opposed ramp means formed on the outer surface of said shank portion in a first intermediate area between adjacent corner posts, said first set of ramp means being located a first predetermined distance from the back surface of said head flange, a second set of opposed ramp means formed on the outer surface of said shank portion and disposed perpendicularly to said first set of ramp means in a second intermediate area between adjacent corner posts, said second set of ramp means being offset from said first set of ramp means and located at a second predetermined distance from the back surface of said head flange to thereby accommodate a variety of panel thicknesses, a plurality of U-shaped spring-like members being formed on the outer surfaces of said shank portion and interconnecting each of said first and second sets of ramp means to corresponding adjacent corner posts, said first set of ramp means, said second set of ramp means, and said spring-like members extending axially between said back surface of said head flange and said end member; and
   said corner posts, said first set of ramp means, said second set of ramp means, and said U-shaped spring-like members forming a closed periphery for said shank portion.

2. A screw grommet as claimed in claim 1, wherein said shank portion is substantially square and wherein there are provided eight U-shaped spring-like members.

3. A screw grommet as claimed in claim 2, wherein said first set of ramp means includes a first surface which tapers outwardly from the entering end and a second surface which tapers inwardly to the back surface of said head flange to form a first shoulder means.

4. A screw grommet as claimed in claim 3, wherein said second set of ramp means includes a third surface which tapers outwardly from the entering end and a fourth surface which tapers inwardly to the back surface of said head flange to form a second shoulder having a different axial spacing from the back surface than said first shoulder means.

5. A screw grommet as claimed in claim 1, wherein said opening in said head flange is defined by four inwardly inclined wall segments which terminate adjacent the bore in said shank portion.

6. An enclosed plastic screw grommet for insertion and retention in an aperture in a panel for receiving a threaded element so as to mount another apertured member to the panel, said grommet comprising:
   a relative flat head flange having a central opening therein and being formed of a front surface and a back surface;
   said head flange being formed with a pair of radially extending U-shaped slots which are located opposite each other, each of said slots extending inwardly from the periphery thereof and terminating a short distance from said opening so as to present head portions being resiliently inwardly flexible to facilitate its insertion into the panel aperture with a reduced force;
   a shank portion extending from the back side of said head flange and defining a threaded element receiving bore which is in communication with said central opening in said head flange;
   said shank portion including four convexshaped corner posts extending axially from said back surface of said head flange, an end member interconnecting the free ends of said corner posts and being spaced from said back surface to define a closed free entering end on said shank portion, a first set of opposed ramp means formed on the outer surface of said shank portion in a first intermediate area between adjacent corner posts, said first set of ramp means being located a first predetermined distance from the back surface of said head flange, a second set of opposed ramp means formed on the outer surface of said shank portion and disposed perpendicularly to said first set of ramp means in a second intermediate area between adjacent corner posts, said second set of ramp means being offset from said first set of ramp means and located at a second predetermined distance from the back surface of said head flange to thereby accommodate a variety of panel thicknesses, a plurality of U-shaped spring-like members being formed on the outer surfaces of said shank portion and interconnecting each of said first and second sets of ramp means to corresponding adjacent corner posts, said first set of ramp means, said second set of ramp means, and said spring-like members extending axially between said back surface of said head flange and said end member; and
   said corner posts, said first set of ramp means, said second set of ramp means, and said U-shaped spring-like members forming a closed periphery for said shank portion.

7. A screw grommet as claimed in claim 6, wherein said shank portion is substantially square and wherein there are provided eight U-shaped spring-like members.

8. A screw grommet as claimed in claim 7, wherein said first set of ramp means includes a first surface which tapers outwardly from the entering end and a second surface which tapers inwardly to the back surface of said head flange to form a first shoulder means.

9. A screw grommet as claimed in claim 8, wherein said second set of ramp means includes a third surface which tapers outwardly from the entering end and a fourth surface which tapers inwardly to the back surface of said head flange to form a second shoulder having a different axial spacing from the back surface than said first shoulder means.

10. A screw grommet as claimed in claim 6, wherein said opening in said head flange is defined by four inwardly inclined wall segments which terminate adjacent the bore in said shank portion.

11. An enclosed plastic screw grommet for insertion and retention in an aperture in a panel for receiving a threaded element so as to mount another apertured member to the panel, said grommet comprising:
- a relative flat head flange having a central opening therein and being formed of a front surface and a back surface;
- said head flange being formed with at least one radially extending U-shaped slot, said at least one slot extending inwardly from the periphery thereof and terminating a short distance from said opening so as to present head portions being resiliently inwardly flexible to facilitate its insertion into the panel aperture with a reduced force;
- a shank portion extending from the back side of said head flange and defining a threaded element receiving bore which is in communication with said central opening in said head flange;
- said shank portion including four convexshaped corner posts extending axially from said back surface of said head flange, an end member interconnecting the free ends of said corner posts and being spaced from said back surface to define a closed free entering end on said shank portion, a first set of opposed ramp means formed on the outer surface of said shank portion in a first intermediate area between adjacent corner posts, said first set of ramp means being located a first predetermined distance from the back surface of said head flange, a second set of opposed ramp means formed on the outer surface of said shank portion and disposed perpendicularly to said first set of ramp means in a second intermediate area between adjacent corner posts, said second set of ramp means being offset from said first set of ramp means and located at a second predetermined distance from the back surface of said head flange to thereby accommodate a variety of panel thicknesses, a plurality of U-shaped spring-like members being formed on the outer surfaces of said shank portion and interconnecting each of said first and second sets of ramp means to corresponding adjacent corner posts, said first set of ramp means, said second set of ramp means, and said spring-like members extending axially between said back surface of said head flange and said end member; and
- said corner posts, said first set of ramp means, said second set of ramp means, and said U-shaped spring-like members forming a closed periphery for said shank portion.

* * * * *